United States Patent Office 3,320,202
Patented May 16, 1967

3,320,202
POLYTRIMELLITAMIDE SOLUTIONS AND
COATINGS THEREFROM
Benjamin A. Bolton and James R. Stephens, Gary, Ind.,
assignors to Standard Oil Company, Chicago, Ill., a corporation of Indiana
No Drawing. Filed Oct. 1, 1964, Ser. No. 400,890
12 Claims. (Cl. 260—30.2)

This invention relates to aromatic polytrimellitamide polymers and their use in producing insulating and protective coating on an electrical wire and other surfaces, and more particularly to the preparation of particular solutions of the polymers and their use in producing solid, smooth, continuous coatings without blisters.

Aromatic polytrimellitamide polymers, as described in copending application S.N. 336,857 filed Jan. 19, 1964, and now abandoned, have been shown to produce insulating and protective coatings which exhibit excellent dielectric properties and low weight loss upon exposure to heat. The coatings are commonly prepared from solutions of the soluble polymer which are applied to wire and other surfaces and baked at temperatures of about 400° C. to convert the soluble polymer to its insoluble form. The usual solvents for such solutions have been organic polar solvents such as N,N-dimethylacetamide, N-methylpyrrolidone, and the like, and mixtures of these solvents with less expensive diluents such as xylene.

While these solutions are capable of producing coatings with the above-described excellent properties, frequently problems have been encountered in obtaining a solid, smooth, continuous coating without blisters. Since blisters seriously reduce the protection properties of the coating, they are objectionable in the finished coated article. Attempts to solve the blistering problem have been made by varying the viscosities of the solutions and by preparing various mixtures of different solvents without substantially eliminating the blistering problem.

Therefore, one object of this invention is to produce a solid, smooth, continuous coating without blisters from the aromatic polytrimellitamide polymer. Another object is to prepare solutions of the polymer which when baked on a surface produced the desired coating without blisters. Other objects will be apparent from the detailed description of the invention.

We have found that the blistering problem encountered with the polytrimellitamide solution can be substantially eliminated by combining a nitrogen-containing co-solvent boiling about 220–320° C. with the solution and then carrying out the baking operation. The resulting solid coating is smooth, continuous, and does not exhibit the blistering problem. We consider this result surprising since the more advantageous co-solvents are not considered suitable solvents alone for the polytrimellitamide polymer.

Broadly, the invention is directed to methods of producing solid, smooth, continuous coatings without blisters from an aromatic polytrimellitamide polymer and to compositions suitable for the production of such coatings by utilizing a nitrogen-containing co-solvent boiling about 220–320° C., such as acetanilide, in with the other components of the system.

The method includes the preparation of a solution of the aromatic polytrimellitamide in the usual organic polar solvent boiling below 220° C. Suitable polymers and solvents are described in copending application S.N. 336,857 which is hereby incorporated into and made a part of this specification by reference. Usually, the reaction is carried out in the presence of an organic polar solvent, such as N, N-dimethylacetamide, N-methylpyrrolidone, N-dimethylformamide, dimethylsulfoxide and the like. Polymers of particular interest are those derived from p,p'-methylenebis(analine) and p,p'-oxybis (aniline) because of their convenient preparation and highly satisfactory properties. Advantageously, the solvent is N,N-dimethylacetamide or N-methylpyrrolidone or mixtures thereof. The polyamide of the first reaction is soluble in strongly polar organic solvents, usually in appreciable amounts. Based on N,N-dimethylacetamide, solutions containing about 15 to about 50 percent solids by weight are obtainable. For applications requiring the use of solutions for producing wire coating, impregnating varnishes and the like; solutions of about 25–40 weight percent and advantageously about 35% are desired. Usually, the solution contains about 20 to 35 weight percent of the polytrimellitamide polymer.

Next, a nitrogen-containing organic polar co-solvent boiling about 220–320° C. is combined with the solution, normally in an amount of about 5 to about 40 weight percent of the solvent composition and more usually about 15 to about 30 weight percent.

The co-solvent contains nitrogen and boils about 220–320° C. Suitable co-solvents include high-boiling amides such as acetamide, acetanilide, acetotoluide, acetaniside, and the like, and heterocyclics such as quinoline, isoquinoline, and the like. These include substituted derivatives such as N-methylacetamide, N-benzylacetamide, and the like. Advantageously, the co-solvent is acetamide, acetanilide, or quinoline.

The resulting solution of co-solvent, solvent and polymer is used to produce a liquid film on a wire or other surface and the film is baked at a temperature of about 400° C. to produce solid, smooth, continuous coatings without blisters.

The following examples illustrate some of the embodiments of this invention. It will be understood that these are for illustrative purposes only and do not purport to be wholly definitive with respect to conditions or scope.

*Example I*

Seven pounds of polytrimellitamide polymer prepared from p,p'-methylenebis(aniline) was dissolved in 13 lbs. of a solvent mixture of 25% (by weight) dimethylacetamide and 70% (by weight) N-methylpyrrolidone. The resulting solution had a viscosity of about 40 poises. The solution was used to coat 18 gauge copper wire in a 12 ft. horizontal baking oven. The wire was run at a speed of 17 ft./min. Six coats were applied to obtain a 1.2 mil film thickness. The oven temperature was about 380° C. The coated wire exhibited fine blistering and had a rough surface.

*Example II*

A solution with a viscosity of about 10 poises was prepared by adding 300 g. of N-methylpyrrolidone to 2,000 g. of the coating solution of Example I. The solution was used to coat 18 gauge copper wire under the same conditions as described in Example I. The resulting coating also exhibited fine blistering and was rough.

*Example III*

Three hundred g. of acetamide was added to 2,000 g. of the coating solution of Example I to produce a new solution with a viscosity of about 23 poises. The solution was used to coat 18 gauge copper wire under the same conditions as described in Example I. Surprisingly, the resulting coating was smooth without the blisters of Examples I and II.

*Example IV*

Three hundred g. of acetanilide was added to 2,000 g. of the solution of Example I and an 18 gauge wire was coated under the baking conditions of Example I. The resulting coating was smooth without the blisters of Examples I and II.

While the invention has been described in conjunction with specific examples thereof, these are illustrative only. Accordingly, many alternatives, modifications, and variations will be apparent to those skilled in the art in the light of the foregoing description; and it is therefore intended to embrace all such alternatives, modifications, and variations as to fall within the spirit and broad scope of the appended claims.

We claim:

1. An aromatic polytrimellitamide solution suitable for producing solid, smooth, continuous coatings without blisters at baking temperatures of about 400° C., said solution comprising about 15 to 40 weight percent of said polytrimellitamide, an organic polar solvent selected from the group consisting of nitrogen-containing and sulfoxide-containing polar solvents boiling below about 220° C., and a nitrogen-containing organic polar boiling about 220–320° C.; wherein said co-solvent is present in an amount equal to about 5 to 40 weight percent of the solution.

2. The solution of claim 1 wherein said co-solvent is acetamide.

3. The solution of claim 1 wherein said co-solvent is acetanilide.

4. The solution of claim 1 wherein said co-solvent is quinoline.

5. The solution of claim 1 wherein the solvent is N,N-dimethylacetamide.

6. The solution of claim 1 wherein the solvent is N-methylpyrrolidone.

7. A method of producing solid, smooth, continuous coatings without blisters from an aromatic polytrimellitamide, which method comprises preparing about 15 to 40 weight percent solution of said aromatic polytrimellitamide in an organic polar solvent selected from the group consisting of nitrogen-containing and sulfoxide-containing polar solvents boiling below 220° C., combining a nitrogen-containing organic polar co-solvent boiling about 220–320° C.; wherein said co-solvent is present in an amount equal to about 5 to 40 weight percent of the solution with said solution, producing a liquid film of the resulting solution on a surface, and baking the film at temperatures of about 400° C. to produce said solid, smooth, continuous coatings without blisters.

8. The method of claim 7 wherein said co-solvent is acetamide.

9. The method of claim 7 wherein said co-solvent is acetanilide.

10. The method of claim 7 wherein said co-solvent is quinoline.

11. The method of claim 7 wherein the solvent is N,N-methylacetamide.

12. The method of claim 7 wherein the solvent in N-methylpyrrolidone.

References Cited by the Examiner

UNITED STATES PATENTS 3,179,614  4/1965  Edwards _____ 260—30.2

FOREIGN PATENTS 570,858  7/1945  Great Britain.

MORRIS LIEBMAN, *Primary Examiner.*

L. T. JACOBS, *Assistant Examiner.*

UNITED STATES PATENT OFFICE
CERTIFICATE OF CORRECTION

Patent No. 3,320,202                              May 16, 1967

Benjamin A. Bolton et al.

It is hereby certified that error appears in the above numbered patent requiring correction and that the said Letters Patent should read as corrected below.

Column 1, line 17, for "19" read -- 10 --; column 2, line 43, for "70%" read -- 75% --; column 3, line 19, after "organic" insert -- polar co-solvent --.

Signed and sealed this 21st day of November 1967.

(SEAL)
Attest:

Edward M. Fletcher, Jr.                                EDWARD J. BRENNER

Attesting Officer                                        Commissioner of Patents